US009858557B2

(12) United States Patent
Soeder

(10) Patent No.: US 9,858,557 B2
(45) Date of Patent: Jan. 2, 2018

(54) TRANSACTION TERMINAL MALWARE DETECTION AND PREVENTION

(71) Applicant: Cylance Inc., Irvine, CA (US)

(72) Inventor: Derek A. Soeder, Irvine, CA (US)

(73) Assignee: Cylance Inc., Irvine, CA (US)

(*) Notice: Subject to any disclaimer, the term of this patent is extended or adjusted under 35 U.S.C. 154(b) by 0 days.

(21) Appl. No.: 15/052,753

(22) Filed: Feb. 24, 2016

(65) Prior Publication Data
US 2017/0243183 A1 Aug. 24, 2017

(51) Int. Cl.
*G06Q 20/10* (2012.01)
*G06Q 20/38* (2012.01)
*G06Q 20/40* (2012.01)
*G06Q 20/20* (2012.01)
*G06Q 20/18* (2012.01)
*G06Q 20/30* (2012.01)
*H04L 29/06* (2006.01)

(52) U.S. Cl.
CPC ........ *G06Q 20/1085* (2013.01); *G06Q 20/18* (2013.01); *G06Q 20/20* (2013.01); *G06Q 20/30* (2013.01); *G06Q 20/382* (2013.01); *G06Q 20/407* (2013.01); *H04L 63/145* (2013.01)

(58) Field of Classification Search
USPC .......................................... 705/16
See application file for complete search history.

(56) References Cited

U.S. PATENT DOCUMENTS

| | | | | |
|---|---|---|---|---|
| 6,516,302 B1 * | 2/2003 | Deaton | ................. | G06Q 20/20 |
| | | | | 705/14.38 |
| 8,856,869 B1 * | 10/2014 | Brinskelle | ............... | H04L 63/08 |
| | | | | 726/12 |
| 8,943,598 B1 * | 1/2015 | Kurian | ................... | G06F 21/56 |
| | | | | 726/22 |
| 9,317,851 B2 * | 4/2016 | Little, Jr. | ......... | G06Q 20/40145 |

* cited by examiner

*Primary Examiner* — Garcia Ade
(74) *Attorney, Agent, or Firm* — Jones Day

(57) ABSTRACT

Transaction terminal malicious software is detected by monitoring calls of a first process to identify attempts by the first process to read memory used by a second process. The first and second processes are different from each other and are executed by at least one data processor forming part of a transaction terminal system having at least one transaction terminal. Thereafter, it is determined that the memory used by the second process comprises patterns indicative of sensitive financial or identification information. In response, at least one corrective action is initiated to prevent use of the financial or identification information. Related apparatus, systems, techniques and articles are also described.

58 Claims, 3 Drawing Sheets

100

TRANSACTION TERMINAL MALWARE DETECTION AND PREVENTION

TECHNICAL FIELD

The subject matter described herein relates to the detection of malware and the prevention of sensitive financial and identification information being intercepted or diverted in transaction terminals such as point-of-sale terminals, automated teller machines, vending machines, and the like.

BACKGROUND

Various types of transaction terminals, including point-of-sale (POS) terminals, are attractive targets for cybercriminals wishing to steal financial and/or identification information from cards such as payment cards. Many transaction terminals are simply commodity personal computers running an operating system such as MICROSOFT WINDOWS, and as such, they offer a familiar software development environment for malicious software (malware) as well as the security software intended to defeat it.

Traditional security software can protect against a given species of malware only after it has been updated to include a signature positively identifying that species. This arrangement necessarily creates a window of time from when the malware is used until such time that the malware is identified by researchers and a signature is created and deployed. In the case of malware targeting transaction terminals, cybercriminals using the malware can steal significant amounts of financial and identification information before a security software vendor becomes aware of the malware and publishes a signature to protect against it.

SUMMARY

In one aspect, transaction terminal malicious software is detected by monitoring calls of a first process to identify attempts by the first process to read memory used by a second process. The first and second processes are different from each other and are executed by at least one data processor forming part of a transaction terminal system having at least one transaction terminal. Thereafter, it is determined that the memory used by the second process includes patterns indicative of sensitive financial or identification information. In response, at least one corrective action is initiated to prevent use of the financial or identification information.

The at least one corrective action can be initiated prior to the first process reading the memory used by the second process by denying the corresponding call of the first process being monitored. In other variations, the at least one corrective action can be initiated after the first process reads the memory used by the second process.

The monitored calls can, in some variations, be allowed to complete and the determination is made only if a pre-defined number of bytes are read from memory by the first process.

The transaction terminal can be any of a plurality of different types that help facilitate transactions. Examples include, but are not limited to, point-of-sale (POS) terminals, automated teller machines (ATMs), parts of vending machines (including kiosks), mobile communications devices (e.g., smart phones, tablets, etc.).

Preventing use of the financial or identification information can include preventing the first process from transmitting the financial or identification information from the transaction terminal to a remote software agent or computing system. In addition or in the alternative, preventing use of the financial or identification information can include terminating the first process. Further in addition or in the alternative, preventing use of the financial or identification information can include altering the financial or identification information.

At least one of the monitoring, determining, or initiating can be performed by the transaction terminal. In addition or in the alternative, one or more of the monitoring, determining, or initiating can be performed by a computing device forming part of the transaction terminal system other than the transaction terminal.

The monitoring can be implemented using various techniques including having such monitoring being performed by a software hook. Such a software hook can be executed by the at least one data processor of a gateway server intermediate the transaction terminal and at least one transaction processing system. The software hook can be executed by a third process different from the first process and the second process.

The determination can analyze a buffer utilized by the first process to determine whether the memory allocated to and/or used by the second process comprises patterns indicative of sensitive financial or identification information. Such buffer can form part of fixed memory in the transaction terminal system or it can be a virtual data buffer pointing at a location in fixed physical memory of the transaction terminal system.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. For example, as compared to conventional techniques that detect or prevent certain actions or behaviors in transaction terminals, the current subject matter is more efficient in that it consumes fewer processing resources which, in turn, ensures that malware detection does not impact overall system performance. Moreover, the current subject matter is advantageous in that, unlike conventional systems, it does not raise false alarms/positives when an action believed to be malicious is attempted by benign software within a transaction terminal. Conventional behavioral techniques can also result in antecedent malicious actions being allowed to occur before the anticipated action is detected. Still further, the current subject matter is advantageous in that it does not require signature-like updates to the transaction terminal security software over time to introduce or refine protections.

The details of one or more variations of the subject matter described herein are set forth in the accompanying drawings and the description below. Other features and advantages of the subject matter described herein will be apparent from the description and drawings, and from the claims.

DETAILED DESCRIPTION

The current subject matter is directed to systems, methods, and techniques for detecting and preventing common malware behavior in transaction terminals (referred to herein as TATs). With the current implementation, the enabled protection does not materially degrade overall TAT performance nor does it result in increased levels of false positives. Moreover, importantly, the current subject matter can prevent even the TAT malware's first attempt to collect financial information (e.g., valid payment card data, etc) or other identification information (e.g., user name, address, phone number, etc.).

The term TAT is used herein (unless otherwise specified) to encompass any type of device that can receive financial, identification or other sensitive information from an information source such as a payment card, an access card, or mobile communications device (e.g., phone, tablet, computer, smart watch, etc.). In some cases, the information source is proximal to the TAT or otherwise physically contacts the TAT. Examples of TATs include point-of-sale terminals, automated teller machines, mobile communications devices, access points (e.g., doors, safes, etc.), and the like. TATs can also include other types of devices that exchange Payment Card Industry Data Security Standard (PCI DDS) information as part of an exchange of data between two spatially adjacent or local devices.

Figure 1:
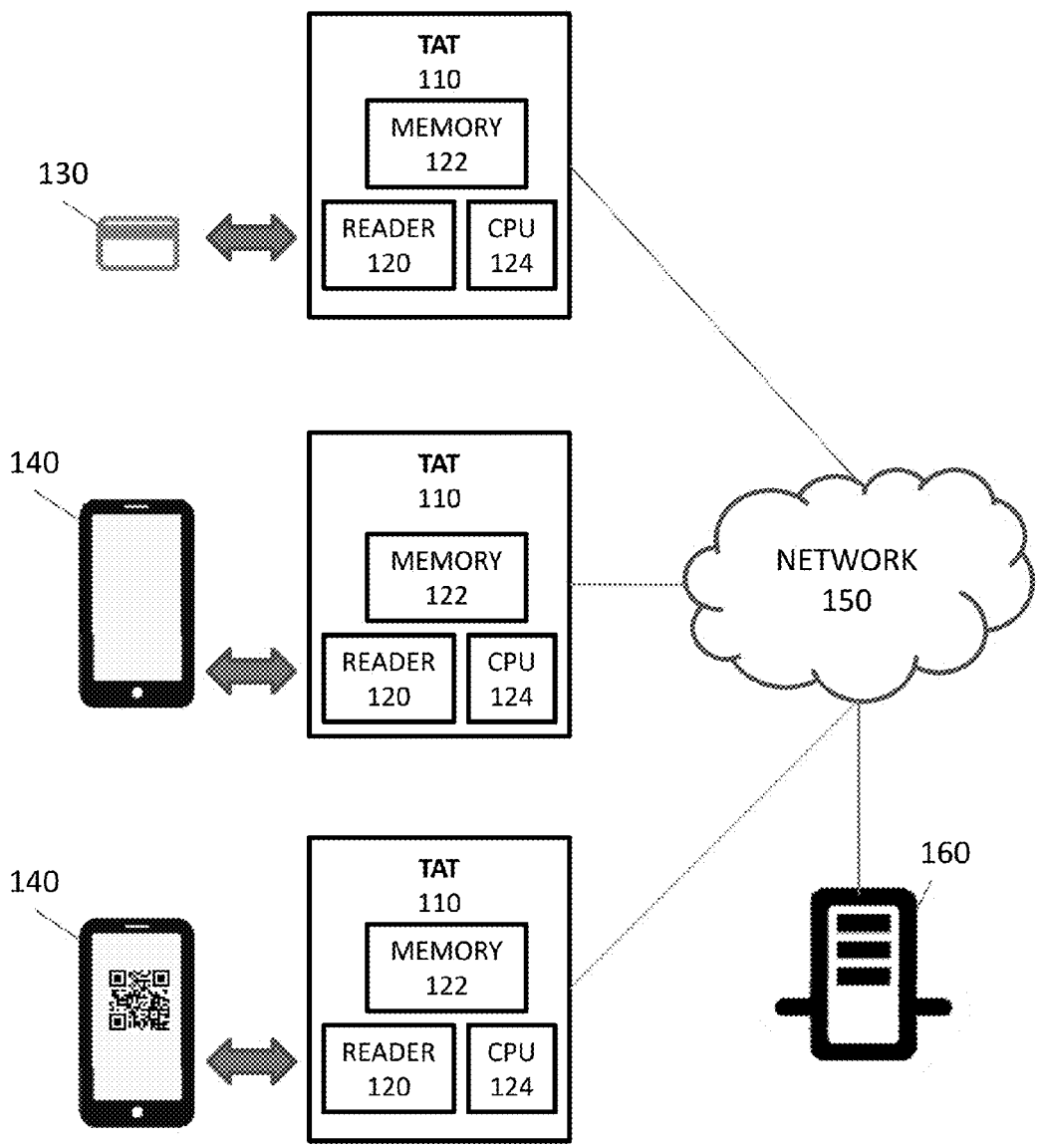
FIG. 1 is a system diagram illustrating a first computing environment involving at least one transaction terminal.

FIG. 1 is a diagram 100 illustrating a computing environment involving various TATs 110. The TATs 110 can be placed at various locations including, for example, adjacent to cash registers, within vending machines, at access points (e.g., doors, security barriers) and/or they can be mobile in nature (i.e., they can form part of a mobile computing device, etc.). Each TAT 110 includes a reader 120, memory 122, and at least one programmable data processor 124 that executes instructions stored in the memory 122.

The reader 120 can take different forms and/or can be a combination of different data reading technologies. In one example, the reader 120 can be a card swiper that physically reads payment and/or identifying information from magnetic stripes and/or an integrated circuit (e.g., a chip of a smart card, etc.) of a card or fob 130 (e.g., a payment card, a room key, etc.) of a card (e.g., payment card, etc.).

In addition or in the alternative, the TAT 110 can include a wireless reader 120 that can wirelessly receive payment and/or identification information from an information source. In some cases, the information source is a card 130 (e.g., payment card or fob, etc.) that, in turn, is a contactless smart card having technology such as non-volatile memory, security specific logic, and RFID that conveys sensitive financial information such as the card serial number (CSN) or other information to the wireless reader 120.

In other cases, the information source can be a mobile computing device (MCD) 140 such as a mobile phone, tablet computer, smart watch, and the like. The MCD 140 can, for example, wirelessly transmit payment and/or identifying data to the wireless reader 120 via various communication protocols including, but not limited to, near field communication (NFC) as well as other technologies that can either mimic or otherwise convey the same information as magnetic secure transmissions. In some cases, the wireless reader 120 comprises a scanner for scanning a bar code or other image. For example, an MCD 140 can render a bar code on its screen which can then be scanned by the wireless reader 120. The bar code can, for example, correspond to payment information for credit card and/or a gift card.

The TATs 110 can be connected to one or more transaction processing systems 160 via a network 150 (which can be wired and/or wireless in nature depending on the particular configuration). The transaction processing systems 160 can receive financial and/or identification information from the TATs 110. Such information, for example, can identify a monetary amount for a proposed transaction (e.g., purchase of groceries, etc.), one or more account numbers, and optionally other identification information specific to the payor. Based on this received information, the transaction processing systems 160 (either directly or by polling or otherwise accessing one or more other computing systems) determine whether or not to approve the proposed transaction. Data approving or denying the proposed transaction is then sent by the transaction processing systems 160 to the corresponding TAT 110 (and optionally other devices or applications coupled to the TAT 110 such as a cash register, tablet computer, and the like). In some cases, a transaction terminal processing system can include both the TAT 110 and the transaction processing systems 160.

Figure 2:
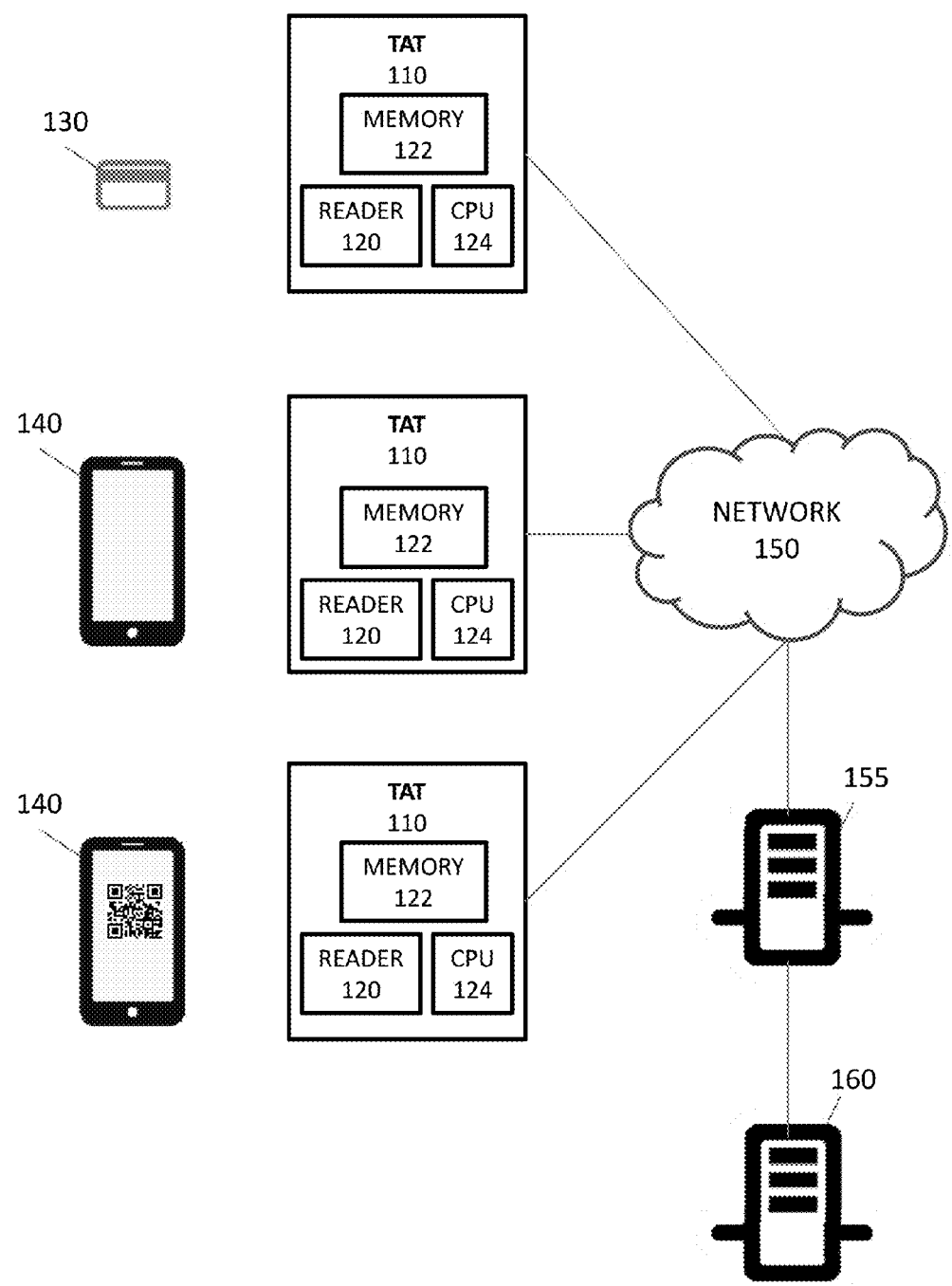
FIG. 2 is a system diagram illustrating a second computing environment involving at least one transaction terminal.

In some variations, there can be an optional gateway server 155 (as illustrated in FIG. 2) disposed intermediate the TATs 110 and the transaction processing systems 160. The gateway server 155 can receive data from the various TATs 110 and potentially store data obtained by the readers in its resident memory for analysis and/or transmission to the transaction processing systems 160. In these cases, a transaction terminal processing system can include the TAT 110, the transaction processing systems 160, and the gateway server 155. The techniques described below in connection with the TATs 110 can, depending on the configuration, also be applied to and executed by the gateway server 155.

The behavior targeted herein is sometimes referred to as "RAM scraping" as it relates to surreptitiously obtaining sensitive financial and identification information as part of a proposed transaction of the TAT from the random access memory 122 in the TATs 110. A process being executed by the processor 124 and that is hosting TAT malware will attempt to access blocks of memory 122 allocated to other processes, in some cases indiscriminately, and inspect the contents of that portion of the memory 122 to search for payment card information and/or identification information.

The desired sensitive information can take a variety of formats. In one example, the sensitive information can take the form of a string of ASCII characters representing the information encoded on one or more tracks of a magnetic stripe of the payment card 130 (magstripe). For example, the magnetic stripe of a credit card can contain track 1 data such as "%B4012345678901234^R/LUKE^1212904?" and track 2 data such as ";4012345678901234=1212904?", wherein the card number, expiration date, and account holder's name (in the case of track 1) are represented, along with delimiting "sentinel" characters and other card information. The RAM scraping malware can then read the memory 122 allocated to the other processes on the TAT 110, searching for and collecting such information for later retrieval by or transmission to the attackers. In some cases, the malware can transmit such sensitive information to a remote agent/computing system via the network 150.

With TATs 110 executing the MICROSOFT WINDOWS operating system, reading memory 122 allocated to another process can be performed using the ReadProcessMemory API function (which by extension can also be understood to refer to the NtReadVirtualMemory and ZwReadVirtualMemory API functions). Accordingly, a naive behavioral protection against TAT malware might simply regard ReadProcessMemory as dangerous and prevent its use, either entirely or beyond a certain threshold; both options have disadvantages. Preventing all use of ReadProcessMemory will likely result in false positives and disrupt benign software, such as programs that use it for interprocess communications, security software that uses it to scan memory 122 allocated to processes for evidence of threats, and debuggers. Preventing use of ReadProcessMemory in excess of certain pre-defined thresholds (whether by frequency, bytes read, or other criteria) can also still result in false positives and also creates a time period during which the TAT RAM scraper malware can operate successfully. The present subject matter avoids these drawbacks by implementing tailored validation logic in conjunction with its ReadProcessMemory instrumentation.

The current systems, methods, and techniques combine interception of ReadProcessMemory with detection of valid financial and/or identification information in the retrieved memory contents of the TATs 110 to avoid both the risk of false positives and the opportunity for successful malware operation. In particular, the current implementation of the protection can use a software hook to monitor API functions to read memory from another process (e.g., to intercept calls to ReadProcessMemory, etc.). The call is allowed to complete, and if it succeeded (partially or entirely) and at least a threshold number of bytes were read from another process, the buffer (i.e., a portion of the memory 122 allocated to the calling process, etc.) into which the bytes were read is examined for occurrences of various formats of financial and/or identifying information.

The routine for examining the buffer (forming part of memory 122) of read bytes comprises a pattern matcher that identifies known alphanumeric sequences and the like within the contents of the buffer. For example, with a payment card, the pattern matching looks for occurrences of a sentinel character, followed by a card number (validated according to its first digits, its number of digits, and the Luhn algorithm), followed by a delimiter, and so on. With the current subject matter, each piece of data expected by the pattern matcher can reduce the probability that bytes not constituting valid payment card information will match, yet—if implemented carefully—it does not reduce the probability that valid payment card information will match, because a number of pieces of information must be collected and retained in order to make legitimate or fraudulent use of the financial and/or identification information. For payment cards 130, besides identifying track 1 and track 2 formats, the pattern matcher can also account for the possibility that the data may be stored in a wide-character representation such as UTF-16.

If a match is identified in the buffer (forming part of memory 122), then the caller of ReadProcessMemory has either intentionally or inadvertently obtained valid financial and/or identification information from memory 122 allocated to another process. The protection then takes action according to policy, which may consider administrator-specified configuration in conjunction with other context and circumstances, such as the calling process and the number of offending calls. In one configuration, calls from a known antivirus process may be made to fail or may mimic success while stripping the financial and/or identification information from the buffer, so that financial and/or identification information is not divulged while still allowing the antivirus process to operate. Offending calls from some other process may result in immediate termination of that process. Alerts may be sent to administrators to prompt them to investigate the circumstances of the violation. Other configurations may progressively increase the severity of the action taken or otherwise deploy more security measures in response to the violation.

Various implementations can intercept ReadProcessMemory through user-mode hooks (including detours hooks and import hooks), kernel-mode hooks (including SSDT hooks), or hypervisor-based hooks. Some implementations may account for financial and/or identification information being split among buffers (for instance, over multiple ReadProcessMemory calls) by maintaining and reassembling the bytes read during each call, by inspecting the memory 122 adjacent to the buffer, or by "tainting" the buffer and tracking how its contents are used. For instance, a buffer determined to be of interest (based on its contents, the code responsible for it, its size, etc.) may be marked using a guard page or a hardware memory breakpoint, and subsequent accesses to the buffer will notify a monitoring program which can examine the surrounding code operating on the buffer. If the contents of the buffer are copied to another portion of memory, that memory may be tainted and similarly monitored. Emulation and dynamic binary instrumentation may alternatively be deployed to accomplish tracing of instructions that operate on the buffer. If it is determined that data obtained from a ReadProcessMemory call is copied into memory of which the contents comprise financial information, a violation is raised.

Figure 3:
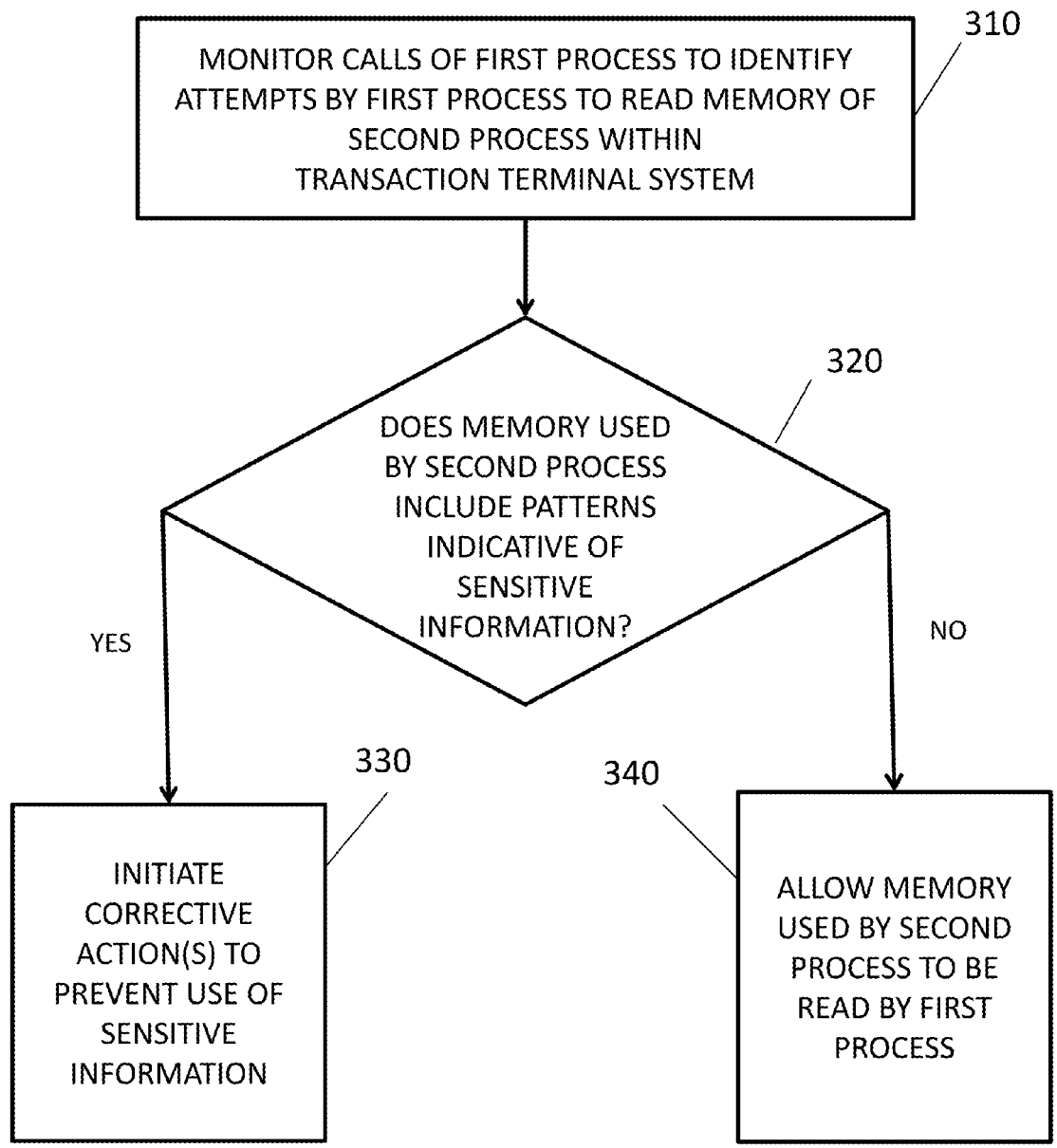
FIG. 3 is a process flow diagram illustrating detection of malware executing as part of a transaction terminal system.

FIG. 3 is a process flow diagram 300 for detecting transaction terminal malicious software in which, at 310, calls of a first process are monitored to identify attempts by the first process to read memory used by a second process. The first and second processes are different from each other and are executed by at least one data processor forming part of a transaction terminal system having at least one transaction terminal. It is then determined, at 320, whether the memory used by the second process comprises patterns indicative of sensitive information (e.g., financial and/or identification information, etc.)—which in turn indicates that malware is operating. If the memory does include such patterns, then, at 330, at least one corrective action is initiated to prevent use of the sensitive information. Otherwise, at 340, the first process is allowed to read the memory used by the second process.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. For example, while the current techniques are mainly described as being implemented by the TATs 110, it will be appreciated that the current subject matter can be implemented by a gateway server 155 that receives financial and/or identification data from the TATs 110. In addition, the current subject matter is applicable to any type of sensitive information and can be applicable to data other than financial and identification information. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method for detecting transaction terminal malicious software comprising:
monitoring, using a software hook monitoring application programming interface (API) functions, calls of a first process to identify attempts by the first process to read memory used by and allocated to a second process, the first and second processes being different from each other and being executed by at least one data processor forming part of a transaction terminal system having at least one transaction terminal;
determining that the memory used by the second process comprises patterns indicative of sensitive financial or identification information; and
initiating at least one corrective action to prevent the financial or identification information from being transmitted external to the at least one transaction terminal;
wherein the monitored calls are allowed to complete and the determining is made only if a pre-defined number of bytes were read from memory by the first process.

2. The method of claim 1, wherein the at least one corrective action is initiated prior to the first process reading the memory used by the second process by denying the corresponding call of the first process being monitored.

3. The method of claim 1, wherein the at least one corrective action is initiated after the first process reads the memory used by the second process.

4. The method of claim 1, wherein the transaction terminal is a point-of-sale (POS) terminal.

5. The method of claim 1, wherein the transaction terminal is an automated teller machine (ATM).

6. The method of claim 1, wherein the transaction terminal forms part of a vending machine.

7. The method of claim 1, wherein the transaction terminal is a mobile communications device.

8. The method of claim 1, wherein the preventing use of the financial or identification information comprises preventing the first process from transmitting the financial or identification information from the transaction terminal to a remote software agent or computing system.

9. The method of claim 1, wherein the preventing use of the financial or identification information comprises terminating the first process.

10. The method of claim 1, wherein the preventing use of the financial or identification information comprises altering the financial or identification information.

11. The method of claim 1, wherein at least one of the monitoring, determining, or initiating is performed by the transaction terminal.

12. The method of claim 1, wherein at least one of the monitoring, determining, or initiating is performed by a computing device forming part of the transaction terminal system other than the transaction terminal.

13. The method of claim 1, wherein the software hook is executed by the at least one data processor of a gateway server intermediate the transaction terminal and at least one transaction processing system.

14. The method of claim 1, wherein the software hook is executed by a third process different from the first process and the second process.

15. The method of claim 1, wherein the determining analyzes a buffer utilized by the first process to determine whether the memory allocated to and/or used by the second process comprises patterns indicative of sensitive financial or identification information.

16. The method of claim 15, wherein the buffer forms part of fixed memory in the transaction terminal system.

17. The method of claim 15, wherein the buffer comprises a virtual data buffer pointing at a location in fixed physical memory of the transaction terminal system.

18. A system comprising:
at least one data processor; and
memory storing instructions which, when executed, cause the at least one data processor to result in operations comprising:
monitoring, using a software hook monitoring application programming interface (API) functions calls of a first process to identify attempts by the first process to read memory used by and allocated to a second process, the first and second processes being different from each other and being executed by the at least one data processor;
determining that the memory used by the second process comprises patterns indicative of sensitive information; and
initiating at least one corrective action to prevent the sensitive information from being transmitted external to the system;
wherein the monitored calls are allowed to complete and the determining is made only if a pre-defined number of bytes were read from memory by the first process.

19. The system of claim 18, wherein the at least one data processor forms part of a transaction terminal system.

20. The system of claim 18, wherein the sensitive information comprises at least one of: financial information or identification information.

21. The system of claim 18 further comprising:
a reader for obtaining the sensitive information from an information source.

22. A non-transitory computer program product storing instructions which, when executed by at least one data processor forming part of at least one computing device, result in operations comprising:
monitoring, using a software hook monitoring application programming interface (API) functions calls of a first process to identify attempts by the first process to read memory used by and allocated to a second process, the first and second processes being different from each other and being executed by the at least one data processor;
determining that the memory used by the second process comprises patterns indicative of sensitive information; and
initiating at least one corrective action to prevent transmission of the sensitive information external to the at least one computing device;
wherein the monitored calls are allowed to complete and the determining is made only if a pre-defined number of bytes were read from memory by the first process.

23. The method of claim 1, wherein the software hook is a user-mode hook, a kernel-mode hook, or a hypervisor-based hook.

24. The method of claim 15 further comprising:
marking the buffer using a guard page or hardware memory breakpoint such that accesses to the marked buffer are monitored for unauthorized access.

25. The method of claim 24 further comprising:
upon contents of the marked buffer being moved to a different buffer, marking the different buffer using a guard page or hardware memory breakpoint such that accesses to the marked different buffer are monitored for unauthorized access.

26. The system of claim 18, wherein the at least one corrective action is initiated prior to the first process reading the memory used by the second process by denying the corresponding call of the first process being monitored.

27. The system of claim 18, wherein the at least one corrective action is initiated after the first process reads the memory used by the second process.

28. The system of claim 14, wherein the transaction terminal system is a point-of-sale (POS) terminal.

29. The system of claim 14, wherein the transaction terminal system is an automated teller machine (ATM).

30. The system of claim 14, wherein the transaction terminal system forms part of a vending machine.

31. The system of claim 14, wherein the transaction terminal system is a mobile communications device.

32. The system of claim 13, wherein the preventing the sensitive information from being transmitted external to the system comprises terminating the first process.

33. The system of claim 13, wherein the preventing the sensitive information from being transmitted external to the system comprises altering the sensitive information.

34. The system of claim 14, wherein the software hook is executed by the at least one data processor of a gateway server intermediate the transaction terminal system and at least one transaction processing system.

35. The system of claim 18, wherein the software hook is executed by a third process different from the first process and the second process.

36. The system of claim 19, wherein the determining analyzes a buffer utilized by the first process to determine whether the memory allocated to and/or used by the second process comprises patterns indicative of sensitive financial or identification information.

37. The system of claim 31, wherein the buffer forms part of fixed memory in the transaction terminal system.

38. The system of claim 31, wherein the buffer comprises a virtual data buffer pointing at a location in fixed physical memory of the transaction terminal system.

39. The system of claim 31 further comprising:
marking the buffer using a guard page or hardware memory breakpoint such that accesses to the marked buffer are monitored for unauthorized access.

40. The system of claim 34 further comprising:
upon contents of the marked buffer being moved to a different buffer, marking the different buffer using a guard page or hardware memory breakpoint such that accesses to the marked different buffer are monitored for unauthorized access.

41. The system of claim 18, wherein the software hook is a user-mode hook, a kernel-mode hook, or a hypervisor-based hook.

42. The computer program product of claim 22, wherein the at least one corrective action is initiated prior to the first process reading the memory used by the second process by denying the corresponding call of the first process being monitored.

43. The computer program product of claim 22, wherein the at least one corrective action is initiated after the first process reads the memory used by the second process.

44. The computer program product of claim 22, wherein the at least one data processor forms part of a transaction terminal system.

45. The computer program product of claim 44, wherein the transaction terminal system is a point-of-sale (POS) terminal.

46. The computer program product of claim 44, wherein the transaction terminal system is an automated teller machine (ATM).

47. The computer program product of claim 44, wherein the transaction terminal system forms part of a vending machine.

48. The computer program product of claim 44, wherein the transaction terminal system is a mobile communications device.

49. The computer program product of claim 22, wherein the preventing the sensitive information from being transmitted external to the at least one computing device comprises terminating the first process.

50. The computer program product of claim 22, wherein the preventing the sensitive information from being transmitted external to the at least one computing device comprises altering the sensitive information.

51. The computer program product of claim 44, wherein the software hook is executed by the at least one data processor of a gateway server intermediate the transaction terminal system and at least one transaction processing system.

52. The computer program product of claim 22, wherein the software hook is executed by a third process different from the first process and the second process.

53. The computer program product of claim 44, wherein the determining analyzes a buffer utilized by the first process to determine whether the memory allocated to and/or used by the second process comprises patterns indicative of sensitive financial or identification information.

54. The computer program product of claim 53, wherein the buffer forms part of fixed memory in the transaction terminal system.

55. The computer program product of claim 53, wherein the buffer comprises a virtual data buffer pointing at a location in fixed physical memory of the transaction terminal system.

56. The computer program product of claim 53 further comprising:
    marking the buffer using a guard page or hardware memory breakpoint such that accesses to the marked buffer are monitored for unauthorized access.

57. The computer program product of claim 56 further comprising:
    upon contents of the marked buffer being moved to a different buffer, marking the different buffer using a guard page or hardware memory breakpoint such that accesses to the marked different buffer are monitored for unauthorized access.

58. The computer program product of claim 22, wherein the software hook is a user-mode hook, a kernel-mode hook, or a hypervisor-based hook.

\* \* \* \* \*